US011724831B2

(12) United States Patent
Bado et al.

(10) Patent No.: US 11,724,831 B2
(45) Date of Patent: Aug. 15, 2023

(54) ELECTROMAGNETIC SPACETIME CONTINUUM PROPULSION SYSTEM FOR SPACE TRAVEL

(71) Applicant: Robert Bado, Delray Beach, FL (US)

(72) Inventors: Robert Bado, Delray Beach, FL (US); Artem Madatov, North Bethesda, MD (US)

(*) Notice: Subject to any disclaimer, the term of this patent is extended or adjusted under 35 U.S.C. 154(b) by 0 days.

(21) Appl. No.: 17/314,935

(22) Filed: May 7, 2021

(65) Prior Publication Data

US 2022/0371752 A1 Nov. 24, 2022

(51) Int. Cl.
*B64G 1/40* (2006.01)
*F03H 99/00* (2009.01)
*F03H 3/00* (2006.01)
*B64G 1/44* (2006.01)
*B64G 1/42* (2006.01)

(52) U.S. Cl.
CPC .............. *B64G 1/409* (2013.01); *F03H 3/00* (2013.01); *F03H 99/00* (2013.01); *B64G 1/422* (2013.01); *B64G 1/446* (2013.01)

(58) Field of Classification Search
CPC ........ B64G 1/409; B64G 1/422; B64G 1/446; F03H 99/00
See application file for complete search history.

(56) References Cited

U.S. PATENT DOCUMENTS

| 3,235,821 | A | * | 2/1966 | Wilkinson | H01P 1/182 333/159 |
| 5,197,279 | A | * | 3/1993 | Taylor | H02N 11/006 60/200.1 |
| 7,190,108 | B2 | | 3/2007 | La Borde | |
| 8,459,002 | B2 | | 6/2013 | McLean | |
| 2020/0255167 | A1 | * | 8/2020 | Aurigema | B64G 1/409 |

* cited by examiner

*Primary Examiner* — Michael C Zarroli

(57) ABSTRACT

An electromagnetic propulsion system for the movement of spacecraft by means of ejection of the perturbed dark matter. In the present invention, to perturb and accelerate the dark matter, the electromagnetic energy generated by microwave generators is supplied to a number of position-adjustable electromagnetic vibrators that form a phased antenna array inside the waveguide. Since the dark matter permeates the Universe and its reserves are unlimited, it can be used as a working medium in the constant acceleration propulsion system for as long as the electric power supply lasts. Since the electromagnetic propulsion system has infinite reserves of the working medium, the specific impulse is also infinite. The speed of the dark matter jet approaches the speed of light.

6 Claims, 3 Drawing Sheets

ELECTROMAGNETIC SPACETIME CONTINUUM PROPULSION SYSTEM FOR SPACE TRAVEL

FIELD OF THE INVENTION

The present invention generally relates to propulsion technologies for use with spacecraft, more specifically to spacecraft propulsion devices to be used in manned and unmanned space missions.

BACKGROUND OF THE INVENTION

In order for a spacecraft to move, it needs two things: reaction mass and energy. In accordance with the conservation of momentum law, for a propulsion method to change momentum of a spacecraft, it must change momentum of a reaction mass. In a conventional rocket, the fuel is burned, providing the energy, and the reaction products are ejected out of a propulsion device. Momentum is given to the exhaust gases in one direction so the rocket itself gains momentum in the other direction The created thrust force causes acceleration of the spacecraft.

The problem is the amount of fuel onboard a spacecraft is limited. When the spacecraft runs out of fuel its acceleration is no longer possible. Therefore, each launch vehicle reaches its final speed, which is determined by a specific impulse of its fuel. The quality of the propellant is important for the specific impulse: the higher the outflow rate of fuel reaction products, the greater the specific impulse. The specific impulse is numerically equal to the outflow rate. For example, the best propellant oxygen+hydrogen has a specific impulse of 4500 m/s.

To achieve a higher speed of the spacecraft, it is necessary to increase the specific impulse of the fuel by increasing the jet flow rate. For example, in ion drives, a type of electric propulsion thrusters, ionized gas is accelerated in a high-voltage electric field and ejected in the form of a jet. The gas velocity in the jet reaches 10,000-20,000 m/s. Accordingly, the specific impulse of such propulsion device exceeds 10,000 m/s. However, even if supply of electrical energy from solar energy transducers or a nuclear reactor or any other reliable energy source onboard of the spacecraft are deemed to be adequate for lengthy missions within the solar system, supply of the fuel, gas, is still limited. For example, launched on Oct. 24, 1998, the Deep Space 1 probe with a xenon ion engine contained 81.5 kg of fuel (xenon gas). This ion thruster used to consume 2,000 watts of electrical power to generate 0.09 Newton of thrust. After completely exhausting its reserve of xenon, the device had picked up a speed of less than 20 km/s and then continued moving only by inertia. For flights to distant planets and beyond the solar system, it is necessary to significantly increase the specific impulse of an engine.

To increase the specific impulse of the spacecraft, it is necessary to either replenish the conventional propellant while in flight through the interplanetary/interstellar space, or find another working medium that can be used by the spacecraft's propulsion system.

There is indirect evidence that the Universe, all the ordinary (baryonic) matter in it, as well as the space between atoms in the baryonic matter and the space between nucleons in the atomic nucleus, permeated by a continuous medium, a form of matter-energy.

Astronomical observations indicate the presence of a distributed mass in space that is not associated with the baryonic matter, this medium is sometimes called "dark matter/dark energy"—Taylor, A. N.; et al. (1998). "*Gravitational Lens Magnification and the Mass of Abell* 1689". *The Astrophysical Journal.* 501 (2): 539-553, in other works it is called "physical vacuum", "structured vacuum".

A particularly promising way to increase the specific impulse is the use of dark matter as a working medium in the propulsion devices for space travel—*Study of Vacuum Energy Physics for Breakthrough Propulsion* 2004, *NASA Glenn Technical Reports Server*, (pdf, 57 pages, Retrieved 2013 Sep. 18). According to some space researchers, including among others NASA and CERN, the dark matter has a significant distributed mass. "Dark matter/Dark energy" accounts for about 95% of the Universe. All the stars, planets and galaxies (the baryonic matter) make up just about 5% of the Universe—Rubin, Vera C.; Ford, W. Kent, Jr. (February 1970). "*Rotation of the Andromeda Nebula from a Spectroscopic Survey of Emission Regions*". *The Astrophysical Journal.* 159: 379-403. Bibcode:1970ApJ . . . 159 . . . 379R. DOI:10.1086/150317.

Since the mass of dark matter is distributed in space, it's possible to talk about its density—C. Moni Bidin et al. *Kinematical and chemical vertical structure of the Galactic thick disk. II. A lack of dark matter in the solar neighborhood* ( *англ.* )//*The Astrophysical Journal.*—2012. This density is unevenly distributed near massive baryonic objects, since dark matter gravitationally interacts with baryonic mass.

The data received from the Voyager-2 spacecraft show, that at the edge of the heliosphere it encountered and measured, a sudden and significant increase of the dark matter density, the so-called Termination Shock—https://www.jpl.nasa.gov/edu/news/2018/12/18/then-there-were-two-voyager-2-reaches-interstellar-space/. The increasing resistance to the spacecraft's motion within the termination shock region, then the heliosheath region of the heliosphere beyond the termination shock, and then the heliopause region where the Sun's solar wind is stopped by the interstellar medium, lead to a conclusion about the substantially increased density of the dark matter in the interstellar space. The presence of the said resistance to motion attests to the non-zero viscosity of the dark matter, the dark matter's another fundamental property—L. Silberstein, *Phil. Mag.* [6] 39, 161 (1920).

The present inventors believe that all of the known force interactions are carried out by the static or dynamic deformation of the dark matter.

For example, gravitational and electrostatic interactions are based on the static elastic deformation of the dark matter by masses and electric charges. The force of gravity, as well as the electric charge interaction force, is the elastic force of the dark matter pressure.

An example of dynamic deformations of the dark matter are electromagnetic and magnetic fields. In the present inventors' opinion, the magnetic field is a vortex deformation of the dark matter, which is viscously pulled by a moving and rotating charge (electron).

Since electromagnetic and gravitational waves are essentially perturbations (curvatures or deformations that change in time) of the dark matter—B. P. Abbott et al. (*LIGO Scientific Collaboration and Virgo Collaboration*) (2016) "*Observation of Gravitational Waves from a Binary Black Orifice Merger*". *Physical Review Letters.* 116 (6). DOI: 10.1103/PhysRevLett.116.061102, there is a possibility of force interaction between the perturbed dark matter and material objects of the baryonic matter that caused these perturbations, for example, an electromagnetic oscillator. The elastic interaction of the oscillator's electromagnetic waves with a mass of the perturbed dark matter gives the perturbed dark matter an impulse in a certain direction. Simultaneously, the oscillator receives an equal and opposite impulse. The reaction force (reactive thrust) applied to the oscillator can be measured.

The change in the momentum of a certain volume of the dark matter is caused by the energy of an electromagnetic field of the oscillator, therefore depends on the group velocity of electromagnetic waves—Ostrovsky L. A. and Potapov A. I. *Modulated Waves. Theory and Applications.*—Johns Hopkins Uni Press, Baltimore-London-1999. Thus, the closer the group velocity of electromagnetic waves disturbing the dark matter is to the phase velocity of these waves, the greater part of their energy is spent on changing the dark matter's impulse. In the opinion of the present inventors, to accelerate the dark matter, it is necessary to use the traveling waves rather than the standing ones. Under certain conditions, the speed of a dark matter jet can approach the speed of light. Therefore, the specific impulse of such jet can be in millions of m/s.

There is a known device for creating thrust in vacuum by means of reflecting the standing centimeter electromagnetic waves (frequency between 30 and 2 GHz) from the copper walls of an asymmetric resonator, the so-called EmDrive, U.S. Patent US20140013724A1.

One of the explanations for the occurrence of thrust in vacuum during the operation of the EmDrive propulsion device is the interaction of electromagnetic waves with vacuum—White H. Eagleworks Laboratories: *Warp Field Physics.//NASA Technical Reports Server,* Apr. 8, 2013. The thrust force measured by researchers was at least 20 Millinewtons—Yang Juan, Liu Xian-Chuang, Wang Yu-Quan, Tang Ming-Jie, Luo Li-Tao, Jin Yi-Zhou, Ning Zhong-Xi (February 2016). "*Thrust Measurement of an Independent Microwave Thruster Propulsion Device with Three-Wire Torsion Pendulum Thrust Measurement System*". *Journal of Propulsion Technology* [кит.]. 37 (2): 362-371. Yang Juan, Liu Xian-Chuang, Wang Yu-Quan, Tang Ming-Jie, Luo Li-Tao, Jin Yi-Zhou, Ning Zhong-Xi (February 2016). Harold White, Paul March, James Lawrence, Jerry Vera, Andre Sylvester. Other researchers obtained about 170 Millinewtons on a similar device and at the same frequency— *Measurement of Impulsive Thrust from a Closed Radio-Frequency Cavity in Vacuum//Journal of Propulsion and Power.*—Vol. 33.-P. 830-841.-DOI:10.2514/1.b36120. The researchers emphasized that the electromagnetic radiation did not escape the installation, and the energy of the electromagnetic waves was used inside the resonator.

The experiments with traveling electromagnetic waves conducted by the present inventors have shown their much greater efficiency in comparison with standing electromagnetic waves—Robert Bado, Artem Madatov, Maksym Tkachenko "*Innovative propulsion device for deep space missions*" Copyright Registration Number TXu 2-213-328, Aug. 6, 2020 presented by Madatov A., Astapenko V., Tkachenko M. "*Innovative VRD solution for deep space missions*". *69th International Astronautical Congress* 2018. *Space propulsion symposium (C4). Joint Session on Advanced and Nuclear Power and Propulsion Systems* (7-C3.5). The experiments were carried out in installations with multiple oscillators at frequencies of 10 MHz, 100 MHz and 500 MHz. As expected, the specific thrust (N/kW) was proportional to the square of the oscillator's frequency.

The present inventors concluded that in the microwave range, the traveling electromagnetic wave propulsion device will be able to develop a specific thrust of several N/kW.

Electric propulsion is now a mature and widely used spacecraft technology. Electrically powered spacecraft propulsion devices use electrical and also magnetic fields, to change the velocity of spacecraft.

As of 2020, over 500 spacecraft operated throughout the Solar System use electric propulsion for station keeping, orbit raising, or primary propulsion. There are known electromagnetic propulsion devices that use the Lorentz force for spacecraft movement. The Lorentz force, uncompensated by other forces, is the thrust force in those propulsion devices.

DESCRIPTION OF THE PRIOR ART

The closest prior art known to the present inventors at the time of the filing of this application appears to be the one described in the U.S. Pat. No. 8,459,002B2 "Efficient RF electromagnetic propulsion system with communications capability."

This prior art provides an electronic propulsion engine that creates a propulsive force or thrust using electromagnetic forces or electrostatic forces, with an effect that is similar to the thrust of a jet or rocket engine. Forces are generated using electromagnets or capacitor plates that are separated by dielectric spacer cores and are operated with two modulated currents. The two modulated currents are synchronized, but with a relative phase such that the forces on the two magnets or capacitor plates are not balanced. Included are techniques to reduce circuit impedance and control electric-magnetic field dispersion, such as tuned LCR circuits, dielectric core materials between the magnets or capacitor plates, and RF superconductors result in high propulsion efficiencies. The system operates at RF frequencies and can also be used as a communication device.

The device uses electromagnets in the form of flat coils, spaced some distance apart, which reduces the strength of their interaction. The presence of several turns in the coils increases their inductance and limits the maximum frequency of operation in resonance with radio frequencies. It is however known that the efficiency of the propulsion system in low density, low viscosity media e.g. the dark matter is proportional to the square of the oscillator's oscillating frequency. Therefore, for efficient movement in vacuum, it is preferable to use oscillating frequencies in the microwave range, namely from 1 to 100 GHz, and for this it is necessary to use oscillators of small capacity and inductance. Such oscillators are not coils, but rather whip or loop antennas.

Another invention in the field of space propulsion systems is described in the U.S. Pat. No. 7,190,108B2 "Methods and apparatus using pulsed and phased currents in parallel plates, including embodiments for electrical propulsion", wherein the invention provides apparatus and methods in which two conducting plates, distanced a apart, include a plurality of arrayed segments.

A third prior art reference which discusses principles similar to the present invention is described in the RU Patent No. 2141161C1 "Oscillatory electrodynamic mover", Application RU98115102A, describes a device (mover) that is used to convert electromagnetic wave energy in microwave and ultrashort-wave ranges into magnetomotive force by exposing high-frequency current flowing in one oscillator to magnetic components of electrodynamic fields emitted by each electric oscillator. Parallel arrangement of oscillators spaced approximately quarter wavelength apart and phase shift of current though them by quarter cycle result in that vectors of magnetic forces acting on each oscillator are unidirectional and produce motive force. For practical application, oscillators should be made of superconducting materials and placed in vacuum chamber. Mover should be provided with reflectors and insulating barrier.

Reflectors and dielectric baffle increase the efficiency of the device. However, the disadvantages of the device include weak force interaction of vortex magnetic fields that emerge around the vibrators (oscillators) located at a distance of one-quarter wavelength ($\lambda/4$) from each other. In this case, during the one-quarter oscillation period (T/4), the magnetic field around the vibrator has enough time only to propagate for one-quarter wavelength ($\lambda/4$) before it begins to decay. Therefore, the magnetic fields from the two vibrators do not have enough time to overlap each other. Thus, the interaction force of magnetic fields is not strong enough. In addition, the length of vibrators operating at microwave frequencies under resonance conditions is at most a few centimeters, so the resulting force is small. The device's efficiency is reduced due to substantial energy dissipation in the form of electromagnetic radiation.

It should also be noted that the oscillations of only two vibrators do not create a traveling electromagnetic wave with a phase advance difference that would allow the dark matter, due to its non-zero viscosity, to be drawn into motion in one preferred direction in form of jet, so the dark matter with a distributed mass would create a jet thrust in accordance with the law of conservation of momentum.

SUMMARY OF THE PRESENT INVENTION

The invention provides an electromagnetic propulsion system, capable of entraining a certain volume of dark matter in unidirectional motion for obtaining a maximum thrust, as set out in the accompanying claims. The present inventors established the following requirements for the present invention:

The electromagnetic propulsion system must operate in the microwave range;

Already existing technical methods, devices and technological solutions must be used;

The system must include 3 or more vibrators, placed within a microwave waveguide;

The system must be capable of concentrating electromagnetic energy and creating a unidirectional dark matter jet of a maximum speed striving for the speed of light.

Electromagnetic field generation within a semi-closed $H_{10}$ type microwave waveguide, with a reflective endwall at one end, excited by a magnetron at a frequency of 2.45 GHz and above, satisfies all of the above requirements.

The operating principle of the electromagnetic propulsion system is based on creating a traveling electromagnetic wave inside a semi-closed $H_{10}$ type microwave waveguide by three or more, for example four, vibrators. If a certain advance of the oscillation phase is present on each vibrator and the vibrators are positioned along the waveguide in a certain way, the system does not oscillate in resonance but rather in a forced mode.

The phase advance and the distance between the vibrators are selected in such a way so that the energy of the oscillations of the electromagnetic field is propagated in the same direction, namely, in the direction from the reflective endwall of the microwave waveguide toward the open end of the waveguide. In this case, the group velocity of electromagnetic waves increases, approaching their phase velocity (speed of light). A certain part of the energy of electromagnetic oscillations is applied to entrainment of the dark matter involved in oscillations (periodic curvature of the dark matter by an electromagnetic field) toward the open end of the waveguide. The dark matter is disturbed by the oscillations in form of vortices, which are carried by the traveling electromagnetic wave in the direction of the open end of the waveguide and outflows from it as a jet.

It is known that the unperturbed dark matter does not interact with atoms and molecules of the ordinary (baryonic) matter, permeating them and passing through them without resistance. Thus, the unperturbed dark matter replaces, due to its elastic properties, the ejected from the waveguide dark matter by passing through the walls of the waveguide without any resistance. The accelerated volume of the dark matter with a certain mass receives an impulse in the direction of acceleration. According to the law of conservation of momentum, the waveguide and vibrators receive an impulse of equal magnitude and opposite direction. The impulse causes acceleration of the propulsion system, hence creating thrust.

The dark matter jet is accelerated by the local vortex magnetic fields that are induced by ultrahigh-frequency electric currents on the inner surfaces of the waveguide. Alternating magnetic fields are a magnetic component of an alternating electromagnetic field. The electromagnetic field propagates within the waveguide in form of traveling electromagnetic wave reflected from the reflective endwall of the waveguide and coincides in phase with the oscillations of the vibrators. This condition is satisfied when the distance between the said reflective endwall and the first, from the waveguide's reflective endwall, vibrator equals one-half wavelength ($\lambda/2$), and the subsequent vibrators are placed at a distance of one-quarter wavelength ($\lambda/4$), less 1-10% of the wavelength, from the first vibrator and from each other. It ensures the traveling electromagnetic wave phase advance on each vibrator in comparison with free (resonant) oscillations. Under these conditions, the group velocity of electromagnetic waves approaches their phase velocity, striving for the speed of light. The shift of the electromagnetic wave peak envelope in one direction maximizes the entrainment of the dark matter in that direction.

DETAILED DESCRIPTION OF THE PRESENT INVENTION

The operating principle of the electromagnetic propulsion system is based on creating a traveling electromagnetic wave inside a semi-closed H10 type microwave waveguide by three or more, for example four, vibrators. The present inventors chose to use an electromagnetic field of high intensity, preferably above 500 V, and ultra-high frequency of 2.45 GHz and above, generated by a magnetron, to perturb the dark matter.

Generation of electromagnetic oscillations inside a type H10 waveguide by the microwave energy generated by a magnetron is well known and commonly used.

Generation of the electromagnetic waves in the metal waveguide results in emergence of alternating local magnetic fields, induced on the conductive walls of the said waveguide by alternating electric fields. Alternating electric field is induced by a vibrator in form of a whip antenna.

The distance between the whip antenna (vibrator) within the waveguide and the waveguide's rear blank endwall, the reflective endwall, is selected based on the desired electromagnetic wave type. If a standing electromagnetic wave is needed, then this distance is a multiple of one-quarter wavelength ($\lambda/4$), and if a traveling electromagnetic wave is required, then the distance is a multiple of one-half wavelength ($\lambda/2$).

Since the present invention requires a traveling electromagnetic wave, the group velocity of which is as close as possible to the speed of light, the first vibrator (antenna) is placed at one-half wavelength ($\lambda/2$) from the reflective endwall.

Figure 1:
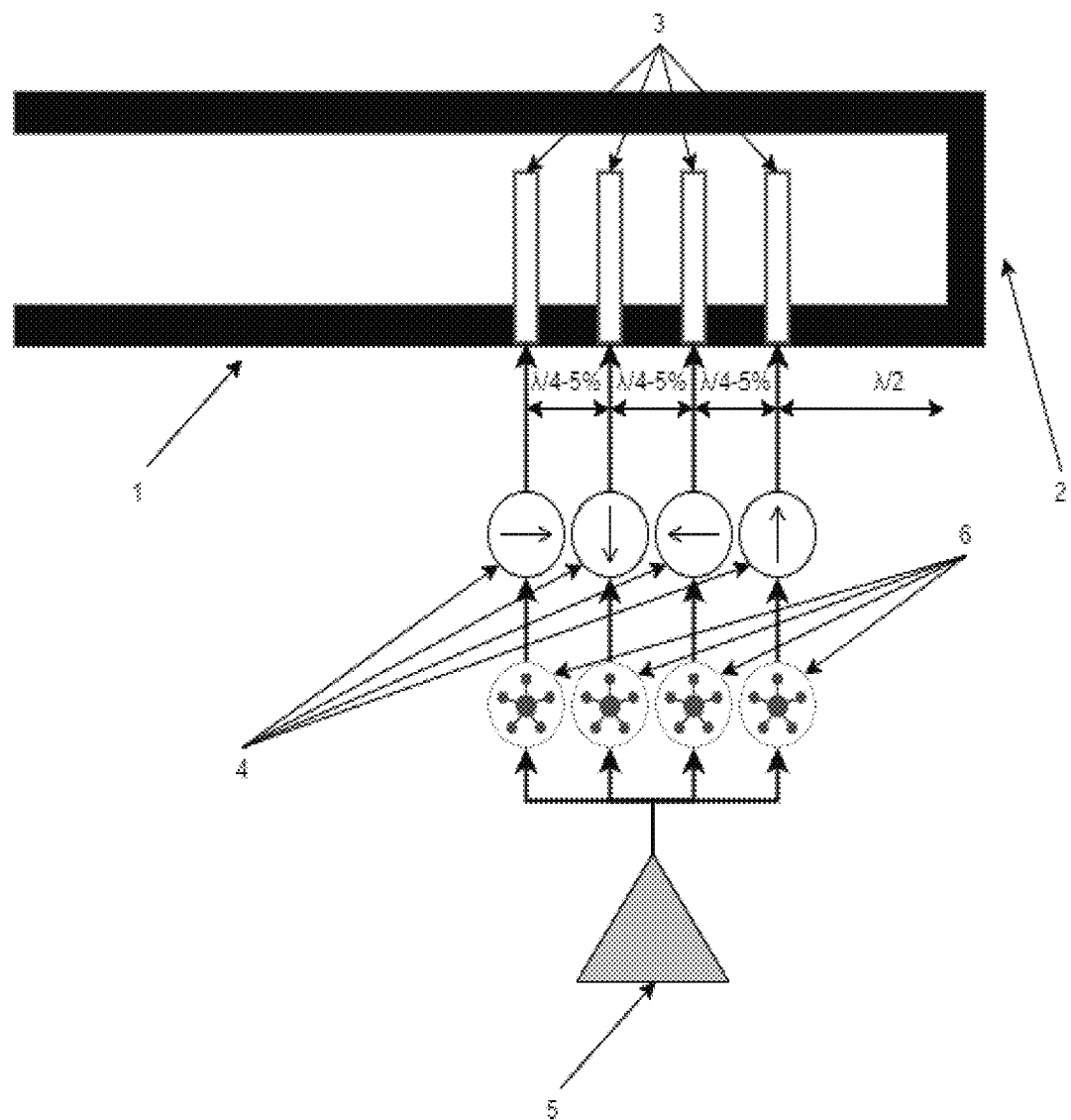
FIG. 1 shows the schematic design of the electromagnetic propulsion system.

The propulsion system, as shown in the FIG. 1, comprises the metal waveguide (1), with the reflective endwall (2), perpendicular to the waveguide's longitudinal axis, the vibrators (3) placed, parallel to each other and to the said reflective endwall, along the waveguide's longitudinal axis, connected through the adjustable phase-shifting devices (4) ensuring the phase shift of the vibrators relative to each other, to the microwave generators (6), interconnected by the phase synchronizer (5) to ensure the in-phase oscillations of the said generators.

The first vibrator is placed inside the said waveguide, on one of the waveguide's sidewalls along its longitudinal axis, at a distance of one-half wavelength ($\lambda/2$) from the said reflective endwall. Each subsequent vibrator is placed, within the waveguide along its longitudinal axis, at a distance slightly smaller than one-quarter wavelength ($\lambda/4$) from a previous vibrator. This said distance between the subsequent vibrators is chosen to be smaller than one-quarter wavelength ($\lambda/4$) by about 1-10%, preferably between 1% and 5% of the wavelength, to ensure the traveling electromagnetic wave phase advance on each vibrator in comparison with free (resonant) oscillations.

Generating the electromagnetic waves within the waveguide helps preventing the dispersion of electromagnetic energy, and propagates it in such a manner so that the electromagnetic wave interacts with the dark matter over a longer length of the microwave beam. As a result, the efficiency of entrainment and acceleration of the dark matter by the electromagnetic energy significantly increases in comparison with an open antenna array.

Although, the multi-whip antennas (vibrators), operating from a single magnetron is a possibility, the present inventors chose to use a separate magnetron for each antenna (vibrator) to add up power and increase thrust of the entire propulsion system.

Figure 2:
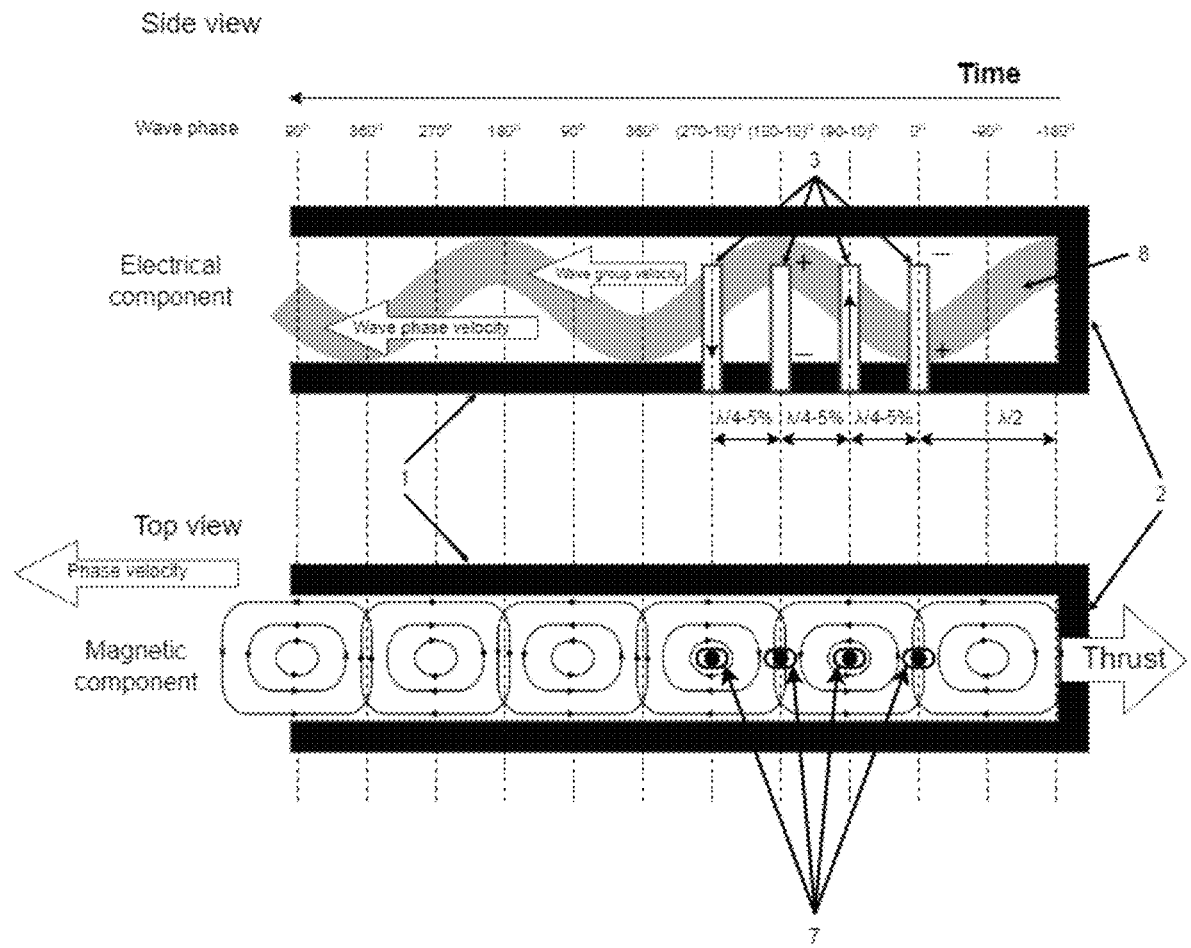
FIG. 2 shows side and top view schematic diagrams of the $H_{10}$ type waveguide with installed vibrators and propagating electromagnetic wave.

In the preferred embodiment of the said electromagnetic propulsion system, as schematically shown in the FIG. 2, the insertion orifices for the vibrators (3) in one of the longitudinal walls of the said waveguide (1) are made in form of longitudinal grooves (7), enabling a possibility of adjusting the vibrator's position to obtain the maximum thrust of the propulsion system.

When the said vibrator, placed at exactly one-half wavelength ($\lambda/2$) distance from the reflective endwall of the waveguide, generates an electromagnetic wave (8) that propagates in both directions along the waveguide's longitudinal axis, the reflected from the reflective endwall in phase 180° (−180°) electromagnetic wave changes direction to opposite and propagates toward the open end of the waveguide. The reflected electromagnetic wave exactly coincides in phase and direction with the electromagnetic wave propagating to the open end of the waveguide from the first vibrator and amplifies it.

When the oscillation phases of the second, third, fourth and all subsequent, if any, vibrators are shifted by 90° from the previous vibrators, and the distance between them is equal to one-quarter wavelength ($\lambda/4$), all vibrators would oscillate in resonance. The energy of all vibrators adds up, and the electromagnetic wave is traveling, thus the group velocity of the electromagnetic waves is close to their phase velocity (speed of light).

The oscillations occur in antiphase in every other vibrator. When the electric field potentials at the ends of the first vibrator are at their maximum, the phase of the said vibrator's oscillations is 0°, the alternating electric current in the vibrator is zero, the magnetic field around the vibrator is zero. In the second vibrator (oscillation phase 90°) and in the fourth vibrator (oscillation phase 270°), the electric currents are at maximum and of opposite directions, and the magnetic field is at maximum. The third vibrator is in the 180° phase and the alternating electric current in it is zero, and the magnetic field around the vibrator is zero.

The present inventors chose the distance between the vibrators to be less than one-quarter wavelength ($\lambda/4$), and the phase shifters to shift the oscillation phases of the vibrators slightly forward (by several angular degrees). Under this condition the electromagnetic wave from the first vibrator arrives at the second and the subsequent vibrators a little earlier than it would otherwise have arrived, were the distance between the adjacent vibrators exactly one-quarter wavelength ($\lambda/4$). Oscillations of the alternating current in the vibrator and the electromagnetic field around the vibrator would also be with a phase advance. The generated by the vibrator electromagnetic wave and the incoming electromagnetic wave from the previous vibrator get superimposed. The front of electric component of the electromagnetic wave becomes asymmetric: the leading edge of the electromagnetic wave becomes steeper, and its trailing edge becomes more gradual. The difference between the leading and trailing front pressure of the electromagnetic wave causes the dark matter with elastic properties to move in the direction of the electromagnetic wave travel. The phase advance sections of the electromagnetic wave oscillations are also shifted in the direction of the electromagnetic wave propagation, thus the group velocity of the electromagnetic wave increases and the electromagnetic wave energy is propagated in the same direction.

The magnetic component of the electromagnetic wave is a local vortex magnetic field that emerge around the vibrators with the alternating current. Since the current in the vibrators is alternating, the magnetic fields are also alternating. These magnetic fields interact with the waveguide, vibrators and with each other (Lorentz force). FIG. 2 shows the magnetic fields around the second and fourth vibrators are at maximum and have propagated to one-quarter wavelength ($\lambda/4$). The field's boundary has managed to propagate beyond the adjacent vibrators as the distance between the vibrators is less than one-quarter wavelength ($\lambda/4$), thus the magnetic fields of all vibrators crossed.

Since the repulsive force between two magnetic fields is inversely proportional to the square of the distance, it is significant and can be used for the purpose of this propulsion system. At the moment of the maximum magnetic field strength at a distance of less than one-half wavelength ($\lambda/2$) (less than 6 cm at a frequency of 2.45 GHz), the magnetic repulsion force can exceed 100 N, using a standard commercially available household magnetron (microwave oven type). Therefore, the said vibrators must be mechanically firmly and rigidly secured in their respective insertion orifices within the said waveguide.

As the traveling electromagnetic wave moves towards the waveguide's open end, the distance between the maxima and minima of the magnetic components of the electromagnetic wave increases to one-half wavelength ($\lambda/2$), the magnetic field oscillations transition to free-inertial from the forced ones. Therefore, the repulsive forces are weakening almost to zero. It should be noted, the electrical and magnetic resistance of the dark matter, while being small is not zero due to dielectric and magnetic permeability of the dark matter, prevents the repulsive forces of the maxima of the said magnetic components of the electromagnetic wave from falling to zero even after the electromagnetic wave is withdrawn from the vibrators. This creates additional wave pressure on the vibrators and the reflective endwall of the waveguide. Consequently, the resultant of the forces is directed towards the reflective endwall of the waveguide. The magnetic fields are coupled to the vibrators and the reflective endwall of the waveguide. Therefore, the thrust force of the propulsion system is applied to the vibrators and to the waveguide.

Figure 3:
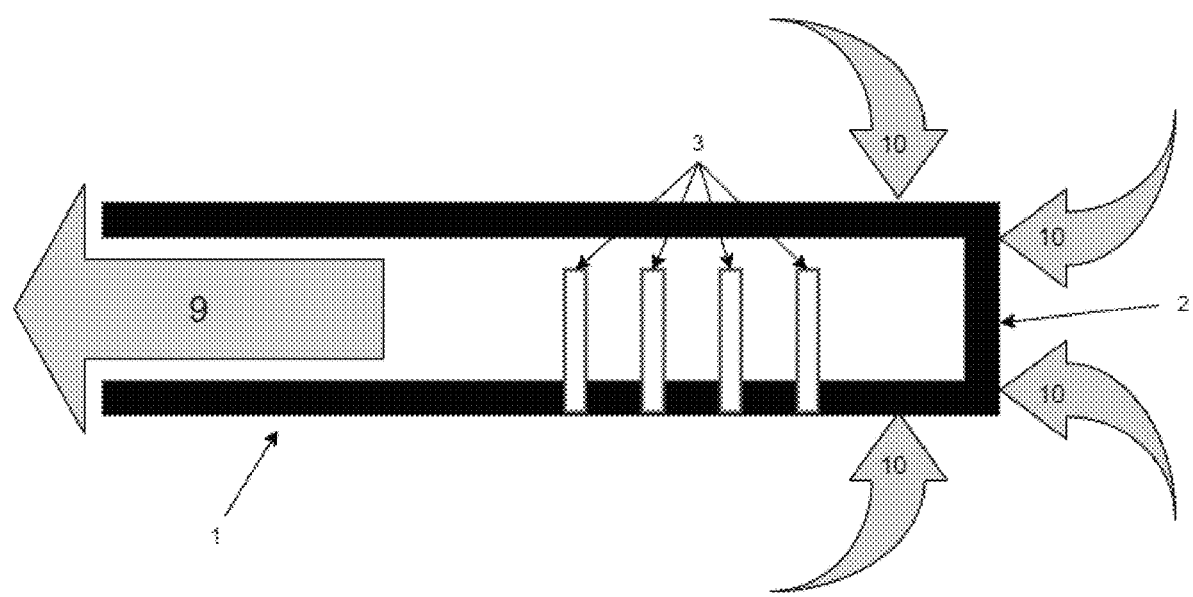
FIG. 3 shows the schematic diagram of dark matter movement through the waveguide.

A jet of the accelerated dark matter (9) is ejected from the waveguide (1) (FIG. 3). The ejected dark matter is replaced through the walls of the waveguide (1), by the unperturbed dark matter (10) that enters the waveguide (1) from the surrounding space.

Since the dark matter has a distributed mass, it's motion relative to the mechanically interconnected vibrators and the waveguide, generates a thrust force according to the law of conservation of momentum. The thrust force is numerically equal to the difference of elastic repulsive forces between the vortex magnetic components of the electromagnetic wave. Adjacent magnetic components of the electromagnetic wave are the result of the induction of magnetic fields by the opposite electric currents in the vibrators. The Lorentz force pushes these magnetic fields away from each other, because they are induced by the opposite electric currents. Since the distance between the vibrators is less than one-quarter wavelength ($\lambda/4$), the propagating with a speed of light magnetic fields around the vibrators have enough time to overlap before reaching their maximum and beginning to decrease.

Thus, the combination of the above solutions in the said propulsion system led to the emergence of qualitatively new features:

Placing several vibrators inside the waveguide makes it possible to add up and concentrate electromagnetic energy, increasing the efficiency of the propulsion system;

Traveling electromagnetic wave accelerates the dark matter in one preferred direction much better than a standing electromagnetic wave, resulting in increased thrust;

Three or more vibrators that oscillate with phase advance shift, allow effectively perturbing and accelerating the dark matter due to the asymmetry of the leading and trailing edges of the electromagnetic waves.

Outflow of the reactive dark matter jet from the propulsion system results in emergence of reactive thrust used for propulsion.

The invention claimed is:

1. An electromagnetic propulsion system comprising a semi-closed H10 type microwave waveguide, that propagates unidirectional electromagnetic waves, these waves are produced by a plurality of at least three electromagnetic vibrators, these vibrators deliver electromagnetic energy to the waveguide, the electromagnetic energy is generated by a plurality of at least three microwave generators and synchronized by at least one phase synchronizer, and is delivered to the vibrators through a plurality of at least three phase-shifting devices.

2. The H10 type microwave waveguide according to claim 1, characterized in that the waveguide's closed end is a reflective endwall perpendicular to the waveguide's longitudinal axis and longitudinal walls.

3. The electromagnetic propulsion system according to claim 1, characterized in that the vibrators are placed inside the waveguide, along its longitudinal axis, through insertion orifices in the waveguide's longitudinal wall.

4. The electromagnetic propulsion system according to claim 3, characterized in that the vibrators are placed parallel to each other and to the reflective endwall, wherein the vibrator closest to the reflective endwall is placed at a distance of one-half wavelength ($\lambda/2$) from the reflective endwall, so that the electromagnetic wave reflected from the reflective endwall is in phase with the vibrator's own oscillations, resulting in emergence of the traveling electromagnetic wave, propagating along the waveguide, and wherein the subsequent vibrators are placed at a distance between the adjacent vibrators of one-quarter wavelength ($\lambda/4$) reduced by 1-10% of the wavelength to ensure the phase advance of each vibrator relative to the phase of the electromagnetic wave coming from the previous vibrator.

5. The electromagnetic propulsion system according to claim 1, characterized in that each of the vibrators receives microwave energy separately from one of the microwave generators through one of the phase shifters, so tuned that the oscillation phases of the vibrators are shifted by one-quarter period less 1-10 angular degrees, and the oscillations of all generators occur in phase, being synchronized with each other by the phase synchronizer.

6. The electromagnetic propulsion system according to claim 3, characterized in that the vibrator insertion orifices in the waveguide's longitudinal wall are of an elongated shape with respect to the waveguide's longitudinal axis, so the vibrator's longitudinal position within the waveguide can be adjusted to change the distance between the vibrators, providing the desirable phase advance of the vibrators relative to the phase of the incoming electromagnetic wave.

* * * * *